Patented July 23, 1946

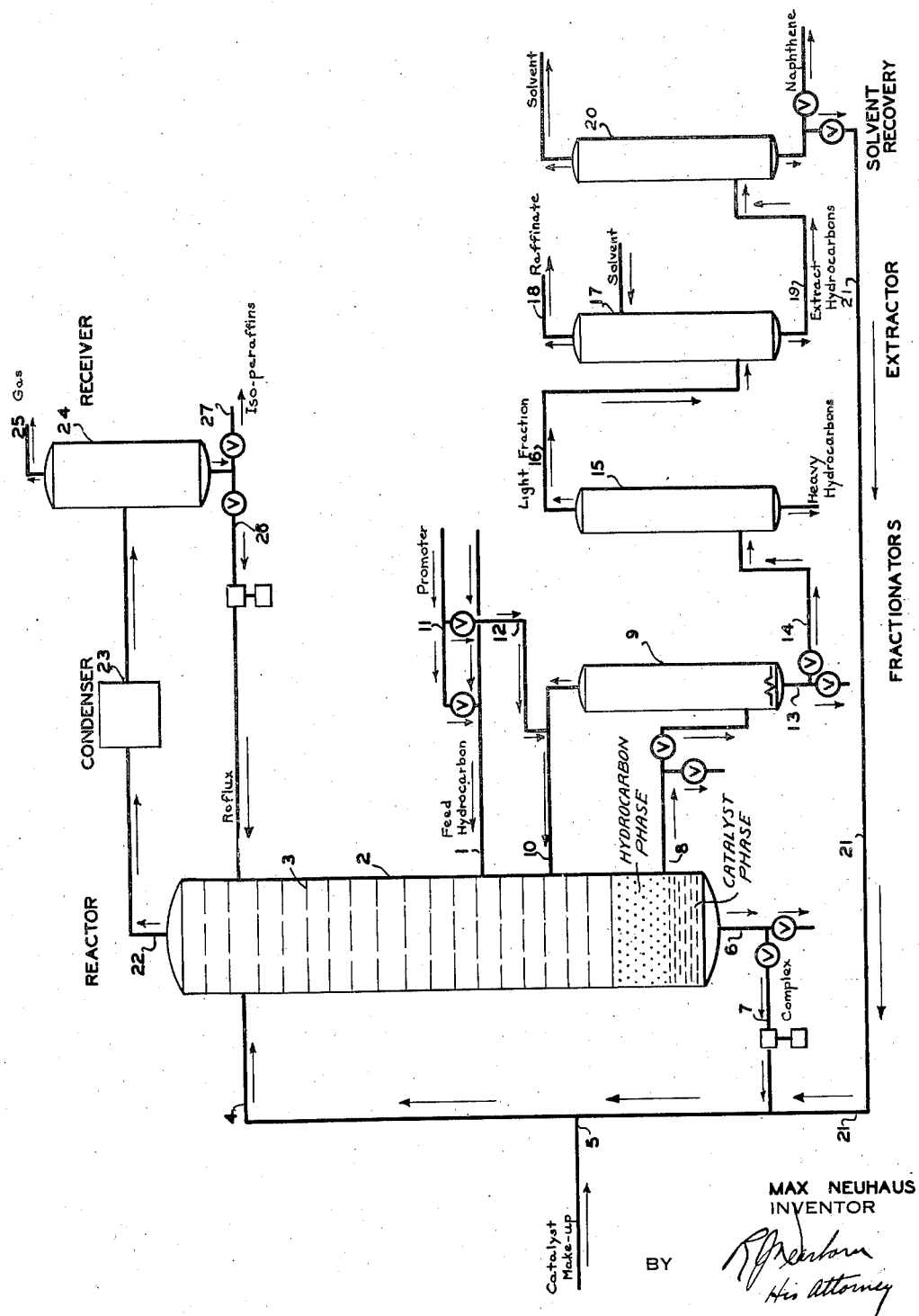

2,404,649

UNITED STATES PATENT OFFICE 2,404,649

ISOMERIZING HYDROCARBONS

Max Neuhaus, Bronxville, N. Y., assignor to The Texas Company, New York, N. Y., a corporation of Delaware Application January 26, 1943, Serial No. 473,581

10 Claims. (Cl. 260—683.5)

This invention relates to isomerizing hydrocarbons and more particularly to effecting the conversion by contact with a liquid isomerization catalyst.

The invention contemplates effecting isomerization of hydrocarbons in a reaction zone wherein hydrocarbons undergoing conversion by contact with a liquid isomerization catalyst are subjected to continuous countercurrent contact under conditions such that isomerization constitutes the principal reaction.

More specifically the invention involves effecting the isomerization reaction in a packed tower or preferably a bubble tray type of tower having provision for the continuous recycling of the liquid catalyst through the tower. The liquid catalyst advantageously comprises a catalyst such as a metallic halide-hydrocarbon complex which is of greater specific gravity than the hydrocarbons undergoing conversion.

The invention has particular application to the isomerization of saturated gasoline hydrocarbons such as normal pentane, hexane and heptane, although it may be apppplied to other hydrocarbons including normal butane.

In accordance with the invention the reaction is carried out in a packed tower advantageously of the bubble tray type. The feed hydrocarbon such as normal pentane is continuously introduced to the lower portion of the tower, while a stream of catalyst such as aluminum halide-hydrocarbon complex is continuously introduced to the upper portion thereof. Conditions of temperature and pressure are maintained within the tower such that substantial vaporization of the hydrocarbon occurs causing the vaporized hydrocarbon to rise countercurrently to the descending complex catalyst. Contact between the hydrocarbons undergoing conversion and the catalyst is effected in the presence of a suitable promoter such as a hydrogen halide under conditions such that isomerization constitutes the principal reaction.

Moreover, operation of the tower is controlled so that a stream is continuously withdrawn from the top or upper portion of the tower which consists essentially of the isomerized hydrocarbon. Liquid catalyst accumulating in the bottom of the tower is continuously withdrawn and recycled at least in part to the upper portion of the tower.

Provision is also contemplated for accumulating in the bottom portion of the tower both a catalyst phase and a liquid hydrocarbon phase, the latter comprising mainly unreacted hydrocarbons and some higher boiling material that may be formed in the reaction.

These phases may be separately withdrawn, the catalyst phase being recycled. The withdrawn hydrocarbon phase is advantageously subjected to fractionation or fractional distillation so as to separate unreacted hydrocarbons from any higher boiling material present, such higher boiling material being discharged from the system. The unreacted hydrocarbons so obtained are returned to the lower portion of the tower, preferably at a temperature sufficiently elevated so as to provide the necessary reboiling action in the bottom of the tower whereby substantial vaporization of hydrocarbons within the tower is effected.

The temperature at the top of the tower may be controlled by cooling as, for example, by return of part of the isomerized stream as a reflux.

In short, the operation involves effecting substantially simultaneous isomerization of the feed hydrocarbon and fractionation between reacted and unreacted hydrocarbons. The hydrocarbons in passing through the tower are thus subjected repeatedly to alternate vaporization and condensation.

One advantage of the invention, as practiced in a bubble tower reactor, resides in realizing highly effective contact between the liquid catalyst and liquid hydrocarbons undergoing treatment on each tray since the vaporized hydrocarbons are caused to bubble through the liquid hydrocarbons and liquid catalyst under conditions such that substantial agitation with consequent thorough mixing is realized.

Thus, on each tray there are substantial quantities of two liquids, i. e., liquid catalyst and liquid hydrocarbons, both of which overflow from tray to tray. In the quiescent state the normal tendency is for these liquids to stratify into layers due to the difference in their specific gravities. However, the passage of vaporized hydrocarbons through the bubble caps on each tray effects continual mixing between the liquid hydrocarbons and liquid catalyst on each tray. Consequently the isomerization for the most part involves isomerization of the hydrocarbons while in the liquid phase.

Other advantages include provision for a unitary operation for effecting isomerization and separation of reacted hydrocarbons from unreacted hydrocarbons; means for obtaining from the reaction tower a stream of treated hydrocarbons consisting essentially of the desired isomerized hydrocarbons; and provision for continuous removal from the reaction zone of higher boiling hydrocarbons that may be formed in the reaction, such material being removed substantially as rapidly as formed and thereby materially reducing catalyst deterioration that would otherwise occur.

Moreover, by employing the principle of counter-current contact between liquid catalyst and hydrocarbons undergoing treatment it is possible to carry out the conversion reaction under conditions which more closely approach realizing the maximum equilibrium concentration of isomerized hydrocarbons without encountering excessive cracking and other undesired side reactions. The temperature gradient, which exists through the tower, favors maximum conversion since the temperature decreases upwardly through the tower. A lower temperature near the point of catalyst introduction to the reaction zone permits maximum equilibrium concentration of the isoparaffin in the products leaving the reaction zone.

Mention has already been made of a metallic halide-hydrocarbon complex as one example of a suitable catalyst.

It is contemplated that such complex be substantially free from undissolved solid metallic halide. A desirable catalyst comprises aluminum halide-hydrocarbon complex of such character that when a minor portion of the complex is mixed with a major portion of water the heat evolved from the mixture amounts to about 200 to 400 and preferably about 300 to 320 calories per gram of catalyst.

For convenience this liberated heat may be referred to as the "heat of hydrolysis." This is determined, for example, by breaking an ampoule containing a weighed amount of complex, for example, about 3 grams in a weighed quantity of water about 300 grams contained in a thermos flask or calorimeter initially at about normal room temperature. The mixture is stirred and the rise in temperature measured. From this rise in temperature the heat liberated is calculated as calories per gram of complex. The complex may be prepared by reacting aluminum chloride with kerosene or gasoline hydrocarbons, aliphatic hydrocarbons in general being preferred. The reaction is effected in the presence of hydrogen chloride or other halide. For example, 1000 parts by weight of anhydrous aluminum chloride powder is mixed with about 1630 parts by weight of kerosene derived from mixed base crude. This mixture together with 50 parts of hydrogen chloride is charged to a closed reactor and agitated for about 4 hours at a temperature of about 210° F. The reaction mixture is thereafter cooled and the contents removed and separated into phases. The complex phase is removed from the hydrocarbon phase and this complex comprises the liquid complex catalyst.

While mention has thus been made of aluminum chloride in preparing the complex nevertheless it is contemplated that other metallic halides including aluminum bromide may be employed.

In the practice of the invention it is desirable to purify the feed hydrocarbons to remove olefinic and aromatic constituents and other materials which may react with the catalyst causing catalyst deterioration or which may otherwise react to form undesired compounds. Such preliminary treatment may include acid treatment or solvent extraction. Olefins may be removed by polymerization.

Aromatic constituents should be reduced to not more than a fraction of a per cent or at most to about 2 or 3% by weight of the feed hydrocarbon since the presence of even this amount exerts an inhibiting effect upon the isomerization reaction unless more elevated temperatures are employed. In certain instances it may be desirable to maintain a limited amount of aromatic material in the reaction carrying out the reaction at more elevated temperatures so that substantial isomerization is obtained. It has been found that under certain conditions, the presence of such a small amount of aromatic material may permit carrying out the isomerization reaction at higher temperatures without realizing excessive cracking. In this connection an advantageous cracking inhibitor comprises naphthene hydrocarbons such as cyclopentanes, cyclohexanes and cycloheptanes. It has been found, for example, that normal pentane may be isomerized with an aluminum halide type of catalyst at temperatures in the range 160 to 200° F. without substantial cracking occurring when the reaction is carried out in the presence of about 10% or so of cyclohexane by weight of the normal pentane undergoing conversion.

Therefore, one modification of the present invention involves effecting the reaction in the presence of a suitable cracking inhibitor such as a low boiling naphthene hydrocarbon.

In order to describe the invention in more detail reference will now be made to the accompanying drawing comprising a flow diagram illustrating one mode of practicing the invention.

Referring to the drawing a feed hydrocarbon such as normal pentane is conducted from a source not shown through a pipe 1 to a lower portion of a reactor 2.

The reactor 2 advantageously comprises a tower packed with bubble trays 3. The bubble trays may be of more or less conventional design having risers and caps so that a substantial depth of liquid comprising both catalyst and hydrocarbons, may be maintained upon each tray, through which liquid rising vapors are caused to bubble as they pass upwardly through the tower thereby effecting the previously described mixing between catalyst and liquid hydrocarbons.

Advantageously a substantial space is provided in the bottom portion of the tower within which to accumulate liquid descending through the tower and to which reference will be made later.

The catalyst in the form of a liquid complex substantially free from undissolved solid material is introduced to the upper portion of the tower through a pipe 4.

Fresh catalyst from a source not shown may be introduced continuously or intermittently through a pipe 5 which communicates with the previously mentioned pipe 4. Other means of introducing fresh catalyst may be employed such as in solution in a portion of the feed hydrocarbon.

In actual operation, as already described, each of the bubble trays below the point of catalyst introduction contains a quantity of catalyst liquid and hydrocarbon liquid, the surplus overflowing from an upper tray to a lower tray and eventually arriving in the settling space at the bottom of the tower.

The tower is maintained under conditions of temperature and pressure so that vaporization of hydrocarbon occurs within the tower, the vaporized hydrocarbons rising upwardly through the succeeding trays. Liquefied hydrocarbons overflow from tray to tray along with the catalyst and likewise accumulate in the lower portion of the tower.

When charging normal pentane to the reactor the hydrocarbons collecting in the top of the tower will comprise essentially isopentane which is substantially lower boiling than normal pentane. Normal pentane will accumulate in the bottom portion of the tower as well as any higher molecular weight material which may be formed during the reaction.

Thus, in the bottom portion of the tower there will accumulate two phases, namely a catalyst phase and a hydrocarbon phase. The catalyst phase is drawn off from the bottom of the tower through a pipe 6. All or a portion thereof is conducted through a branch pipe 7 which communicates with the previously mentioned pipe 4 and through which latter the withdrawn complex is returned to the tower.

The hydrocarbon phase is continuously drawn off through a pipe 8 and all or in part conducted to a fractionator or stripper 9 wherein the unreacted feed hydrocarbon constituents are stripped or separated therefrom, the remainder or residue comprising the previously mentioned higher molecular weight material.

The fraction comprising unreacted hydrocarbons is then recycled through a pipe 10 to the lower portion of the reactor preferably at a point above that at which it was withdrawn but below the point at which fresh feed is being introduced to the tower. The amount of hydrocarbons so recycled and the temperature at which it is recycled, being such as to supply a substantial amount of heat to the bottom portion of the tower thereby causing substantial vaporization within the tower. These hydrocarbons may be recycled in vapor form.

As indicated in the drawing the promoter such as hydrogen chloride may be continually added from a source not shown through pipes 11 and 12 communicating with the previously mentioned pipes 1 and 10. In this way the promoter may be introduced to the reaction zone. Other means of injecting the promoter to the reaction zone may be employed.

The residual fraction of the withdrawn hydrocarbon phase may be discharged from the bottom of the fractionator 9 through a pipe 13.

When the hydrocarbon phase withdrawn through the pipe 8 is substantially free from higher molecular weight material it may be recycled without the above-described fractionation but after heating sufficiently to supply the required amount of vaporization in the bottom portion of the reactor.

On the other hand when the reaction is being effected in the presence of an added naphthene hydrocarbon it is desirable to subject the withdrawn hydrocarbon phase to additional treating steps, so that the naphthene may be segregated therefrom to permit its return to the upper portion of the reactor.

Thus, the residual fraction drawn off from the fractionator 9 through pipe 13 may be conducted all or in part through a pipe 14 to another fractionator 15 wherein the residual hydrocarbon mixture may be separated into a light fraction comprising the naphthene hydrocarbons and hydrocarbons boiling within the same range but which may have been formed in the isomerization reaction, and a heavier fraction.

The heavier fraction is discharged from the system while the light fraction may be conducted through a pipe 16 to an extractor 17 wherein the hydrocarbon mixture is subjected to contact with a suitable selective solvent.

This solvent is one which has preferential solvent action upon naphthenic constituents and thus exerts selective solvent action as between naphthenes and paraffins.

Suitable examples of a selective solvent comprise furfural, phenol, nitrobenzene, sulfur dioxide, etc.

The resulting raffinate phase comprising paraffin hydrocarbons and some solvent is discharged through a pipe 18 for such further treatment as may be desired including recovery of the solvent therefrom. The extract phase comprising the main body of the solvent with the naphthene hydrocarbons dissolved therein is drawn off through a pipe 19 to a suitable solvent recovery unit 20 wherein the solvent is removed from the naphthene hydrocarbons.

The recovered naphthene hydrocarbons are conducted all or in part through a pipe 21 which communicates with the previously mentioned pipe 4. In this way the recovered naphthene hydrocarbon is returned to the reaction zone to serve as an inhibitor of cracking in the conversion of fresh feed hydrocarbon.

The isoparaffin which accumulates in the top portion of the tower is continuously withdrawn through a pipe 22 communicating with a condenser and cooler 23. From the condenser 23 the liquefied hydrocarbons pass to a receiver 24. Gaseous constituents may be released through a pipe 25. A portion of the isoparaffin accumulating in the receiver 24 may be recycled through a pipe 26 to the upper portion of the reactor 2 to provide reflux cooling therein.

The amount so refluxed will depend to a large extent upon the amount of heat being added at the bottom of the tower.

Isoparaffin hydrocarbons not so refluxed to the top of the tower are continuously discharged through a pipe 27.

The specific procedure described above for treating the hydrocarbon phase withdrawn from the tower through the pipe 8 may vary considerably, for example, azeotropic distillation may be resorted to for the purpose of separating naphthenes from paraffins.

It will be realized that in operating the reactor 2 a temperature differential will exist between the top and bottom thereof which may be of the order of about 10 to 50° F.

The point at which the recycled complex is returned to the reactor may be varied as desired but usually it is advantageous to return it to the tower at a point where the concentration of the isomerized hydrocarbon in the reaction mixture is equal to or less than the equilibrium concentration. In other words, if it is introduced at a point at which the concentration is greater than the equilibrium concentration reversion reactions may occur.

While mention has been made of applying the process to normally liquid hydrocarbons, nevertheless it is also contemplated that it may be applied to the isomerization of normal butane. In isomerizing normal butane the reaction may be carried out under a pressure of 250 pounds and at an average temperature of about 210° F. obtaining a distillate fraction overhead through the pipe 22 which may comprise as much as 98% or more of isobutane.

The process is particularly applicable to the treatment of individual hydrocarbons such as normal butane, normal pentane, normal hexane, etc., rather than mixtures composed of hydrocarbons of different molecular weights. In speaking of individual hydrocarbons, it is, of course, contemplated that the feed may comprise petroleum or hydrocarbon fractions consisting essentially of the individual hydrocarbon or as in the case of a $C_6$ or $C_7$ fraction consisting essentially of a mixture of hydrocarbons having the same number of carbon atoms per molecule.

Reaction temperatures and pressures will depend upon the nature of the feed undergoing treatment. Where the feed consists essentially of normal butane a reaction temperature of about 200 to 220° F. is advantageous. With higher molecular weight hydrocarbons correspondingly lower temperatures are employed unless the reaction is effected in the presence of an inhibitor such as naphthene hydrocarbons. In such case hydrocarbons such as normal pentane, normal hexane, etc., may be isomerized at temperatures which are also in the range about 200 to 250° F.

While specific mention of metallic halide-hydrocarbon complexes as catalysts has been made, it is intended that other liquid isomerization catalysts may be employed, which are heavier than the hydrocarbons undergoing treatment and which are substantially immiscible therewith under the conditions prevailing within the reaction zone.

Obviously many modifications and variations of the invention as above set forth may be made without departing from the spirit and scope thereof, and therefore only such limitations should be imposed as are indicated in the appended claims.

I claim:

1. A process for isomerizing saturated hydrocarbons by contact, in the presence of hydrogen halide, with an isomerization catalyst consisting essentially of aluminum halide-hydrocarbon complex liquid which comprises passing hydrocarbon undergoing conversion through a reaction zone countercurrently to a body of said complex catalyst substantially free from undissolved solid aluminum halide and characterized by having a heat of hydrolysis in the range 200 to 400 calories per gram of complex, subjecting hydrocarbons passing through said zone repeatedly to alternate vaporization and condensation while in contact with the catalyst, continuously removing from said zone a treated hydrocarbon stream consisting essentially of isomerized hydrocarbons, separately withdrawing complex catalyst after contact with entering feed and and returning withdrawn catalyst to the reaction zone at a point in closer proximity to the point of discharge from the reaction zone for isomerized hydrocarbons.

2. The method according to claim 1 in which the catalyst comprises aluminum chloride-hydrocarbon complex.

3. The method according to claim 1 in which the catalyst comprises an aluminum chloride-hydrocarbon complex and is of such character that when a minor portion thereof is mixed with a major portion of water the heat evolved amounts to from about 300 to 320 calories per gram of complex, said complex being substantially free from undissolved solid aluminum halide.

4. A process for isomerizing saturated hydrocarbons by contact with an isomerization catalyst consisting essentially of aluminum halide-hydrocarbon complex liquid which comprises continuously passing hydrocarbons undergoing conversion through a vertical reaction tower containing bubble trays, continuously introducing catalyst complex to the upper portion of said tower, said complex liquid being substantially free from undissolved solid aluminum halide continuously introducing feed hydrocarbon to the lower portion of said tower, supplying heat to the lower portion of said tower sufficient to effect fractionation within the tower between reacted and unreacted hydrocarbons, continuously withdrawing reacted feed hydrocarbons in vapor form from the top of said tower said hydrocarbons consisting essentially of isomerized hydrocarbons, continuously withdrawing catalyst complex from the bottom of said tower, recycling withdrawn complex to the upper portion of said tower, and effecting contact between descending complex and rising hydrocarbons within the tower in the presence of hydrogen halide under conditions such that isomerization constitutes the principal reaction.

5. A process for isomerizing saturated hydrocarbons by contact with an isomerization catalyst consisting essentially of aluminum halide-hydrocarbon complex liquid, which comprises effecting the reaction in a bubble tray tower, passing hydrocarbons undergoing conversion upwardly through said tower countercurrently to descending catalyst under conditions such that isomerization constitutes the principal reaction, said complex being substantially free from undissolved solid aluminum halide and characterized by having a heat of hydrolysis in the range 200 to 400 calories per gram of complex, introducing feed hydrocarbon to a lower portion of said tower, accumulating in said tower below the point of feed hydrocarbon introduction a liquid catalyst phase and a liquid hydrocarbon phase, separately withdrawing said phases from the tower, recycling withdrawn catalyst phase to the upper portion of the tower at a point substantially above that at which feed hydrocarbon is introduced, vaporizing at least a portion of said withdrawn hydrocarbon phase, returning the heated hydrocarbon phase to the tower at a point below that at which feed hydrocarbons are introduced in such amount and at sufficient temperature to cause substantial vaporization of hydrocarbons within the tower and controlling the temperature at the top of said tower to remove continuously a stream consisting essentially of isomerized hydrocarbons.

6. A process for isomerizing normal paraffin hydrocarbons having 4 to 7 carbon atoms and normally free from naphthenic hydrocarbons by contact with an isomerization catalyst consisting essentially of aluminum chloride-hydrocarbon complex liquid, which comprises effecting the reaction in a bubble tray tower, passing hydrocarbons undergoing conversion upwardly through said tower countercurrently to descending catalyst under conditions such that isomerization constitutes the principal reaction, said catalyst being substantially free from undissolved solid aluminum halide and having a heat of hydrolysis of about 300 to 320 calories per gram of complex, introducing feed hydrocarbon to a lower portion of said tower, accumulating in said tower below the point of feed hydrocarbon introduction a liquid catalyst phase and a liquid hydrocarbon phase, said hydrocarbon phase comprising unreacted hydrocarbons and higher boiling hydrocarbons, separately withdrawing said phases, recycling withdrawn catalyst phase to the upper portion of the tower at a point substantially above that at which feed hydrocarbon is introduced, separating from said withdrawn hydrocarbon phase a fraction consisting essentially of unreacted paraffin hydrocarbons, vaporizing said fraction, returning the vaporized fraction to the tower at a point below the point of feed introduction in such amount and at sufficient temperature to cause substantial vaporization of hydrocarbons within the tower and controlling the temperature at the top of said tower to remove continuously a stream consisting essentially of isomerized hydrocarbons.

7. The method according to claim 5 in which the isomerization reaction is effected in the presence of a small amount of added naphthene hydrocarbon.

8. A process for isomerizing normal paraffin hydrocarbons having from 4 to 7 carbon atoms per molecule and normally free from naphthenic hydrocarbons by contact with an isomerization catalyst consisting essentially of aluminum chloride-hydrocarbon complex which comprises effecting the reaction in a bubble tray tower, passing hydrocarbons undergoing conversion upwardly through said tower countercurrently to descending complex liquid in the presence of hydrogen halide and under conditions such that isomerization constitutes the principal reaction, said complex being substantially free from undissolved solid aluminum chloride and characterized by having a heat of hydrolysis of about 300 to 320 calories per gram of complex effecting the reaction in the presence of a small amount of added naphthene hydrocarbon higher boiling than the paraffin hydrocarbon undergoing treatment, introducing feed hydrocarbon to the lower portion of said tower, accumulating in the bottom portion of said tower a liquid catalyst phase and a liquid hydrocarbon phase comprising unreacted feed hydrocarbons, said naphthene hydrocarbon and higher boiling hydrocarbons, separately withdrawing said phases, recycling withdrawn catalyst phase to the upper portion of said tower at a point substantially above the point of feed hydrocarbon introduction, vaporizing from the withdrawn hydrocarbon phase unreacted normal paraffin hydrocarbons, leaving a residual hydrocarbon phase, returning the vaporized hydrocarbons to said tower at a point below the point of feed hydrocarbon introduction in such amount and at such a temperature as to cause substantial vaporization of hydrocarbons within the tower, separating naphthene hydrocarbons from said residual hydrocarbon phase, returning so separated naphthene hydrocarbons to the upper portion of said tower and controlling the temperature at the top of said tower to remove continuously a stream consisting essentially of isomerized hydrocarbons.

9. The process according to claim 8 in which the recycled naphthene hydrocarbons are commingled with recycled catalyst phase prior to return to the upper portion of the tower.

10. A process for isomerizing saturated hydrocarbons which comprises passing hydrocarbons undergoing conversion through a packed reaction tower countercurrently to a body of isomerization catalyst consisting essentially of aluminum chloride-hydrocarbon complex and substantially free from undissolved solid aluminum chloride, subjecting hydrocarbons passing through said tower repeatedly to alternate vaporization and condensation while in contact with the catalyst, effecting said contact in the presence of hydrogen halide under conditions such that isomerization constitutes the principal conversion reaction, removing overhead from said tower a stream consisting essentially of isomerized hydrocarbons, separately withdrawing complex catalyst from the lower portion of said tower, recycling withdrawn complex to the upper portion of said tower, introducing saturated feed hydrocarbons to the portion of the tower at a point intermediate the points of complex withdrawal from and return to the tower.

MAX NEUHAUS.